(12) United States Patent
Fukase et al.

(10) Patent No.: US 6,889,373 B2
(45) Date of Patent: May 3, 2005

(54) PROGRAM GENERATING SUPPORT SYSTEM, PROGRAM GENERATING METHOD, STORAGE MEDIUM AND PROGRAM

(75) Inventors: Mitsuaki Fukase, Tokyo (JP); Tetsu Tatsumi, Tokyo (JP)

(73) Assignee: NS Solutions Corporation (JP)

( * ) Notice: Subject to any disclaimer, the term of this patent is extended or adjusted under 35 U.S.C. 154(b) by 523 days.

(21) Appl. No.: 09/946,734

(22) Filed: Sep. 6, 2001

(65) Prior Publication Data

US 2002/0095654 A1 Jul. 18, 2002

(30) Foreign Application Priority Data

Sep. 6, 2000 (JP) ...... 2000-270163
Aug. 10, 2001 (JP) ...... 2001-244282

(51) Int. Cl.$^7$ ............ G06F 9/44
(52) U.S. Cl. ...... 717/106; 717/100; 717/104; 717/108; 717/116
(58) Field of Search ...... 717/100, 104, 717/106, 108, 116, 136, 140, 102, 156; 707/103 R; 700/83

(56) References Cited

U.S. PATENT DOCUMENTS

| | | | | |
|---|---|---|---|---|
| 5,172,326 A | * | 12/1992 | Campbell et al. | 700/134 |
| 5,287,449 A | * | 2/1994 | Kojima | 345/161 |
| 5,790,855 A | * | 8/1998 | Faustini | 717/100 |
| 5,835,577 A | * | 11/1998 | Disanto et al. | 379/93.19 |
| 5,864,700 A | * | 1/1999 | Barton et al. | 717/156 |
| 6,032,152 A | * | 2/2000 | Pearson | 707/103 R |
| 6,063,128 A | * | 5/2000 | Bentley et al. | 703/6 |
| 6,106,569 A | * | 8/2000 | Bohrer et al. | 717/100 |
| 6,151,703 A | * | 11/2000 | Crelier | 717/136 |
| 6,173,276 B1 | * | 1/2001 | Kant et al. | 706/50 |
| 6,199,195 B1 | * | 3/2001 | Goodwin et al. | 717/104 |
| 6,268,853 B1 | * | 7/2001 | Hoskins et al. | 700/83 |
| 6,300,948 B1 | * | 10/2001 | Geller et al. | 345/866 |
| 6,405,368 B1 | * | 6/2002 | Freyburger | 717/140 |
| 6,785,673 B1 | * | 8/2004 | Fernandez et al. | 707/3 |

OTHER PUBLICATIONS

TITLE: Reuse of algorithms: Still a Challenge to Object–Oriented Programming, author: Weihe, 1997, ACM.*
TITLE: Program Generalization for Software Reuse: From C to C++, author: Stiff et al, ACM, 1996.*
TITLE: Template Instantiation for C++, author: McCluskey, 1992, ACM.*
TITLE: Template–based Program Restructuring—Initial Experience, author: Marshall, ACM, Nov. 1995.*
TITLE: Adding Type Parameterization to the Javaä Language, author: Agesen et al, ACM, Oct., 1997.*

* cited by examiner

*Primary Examiner*—Chameli C. Das
(74) *Attorney, Agent, or Firm*—Connolly, Bove, Lodge & Hutz LLP

(57) ABSTRACT

Templates are multiplexed such that at least a part of a content description of a higher order parent template is represented by a lower order child template, and a desired source code is generated by performing instantiation from the lower order child template, and by inputting the generated lower order child instance into the higher order parent template to perform further instantiation. Accordingly, the pattern of the content description that is being expanded as a source code is made flexible, and it becomes possible to easily generate different source codes by merely changing the lower order child template without a need of changing the engine program used for instantiation.

16 Claims, 9 Drawing Sheets

F I G. 2
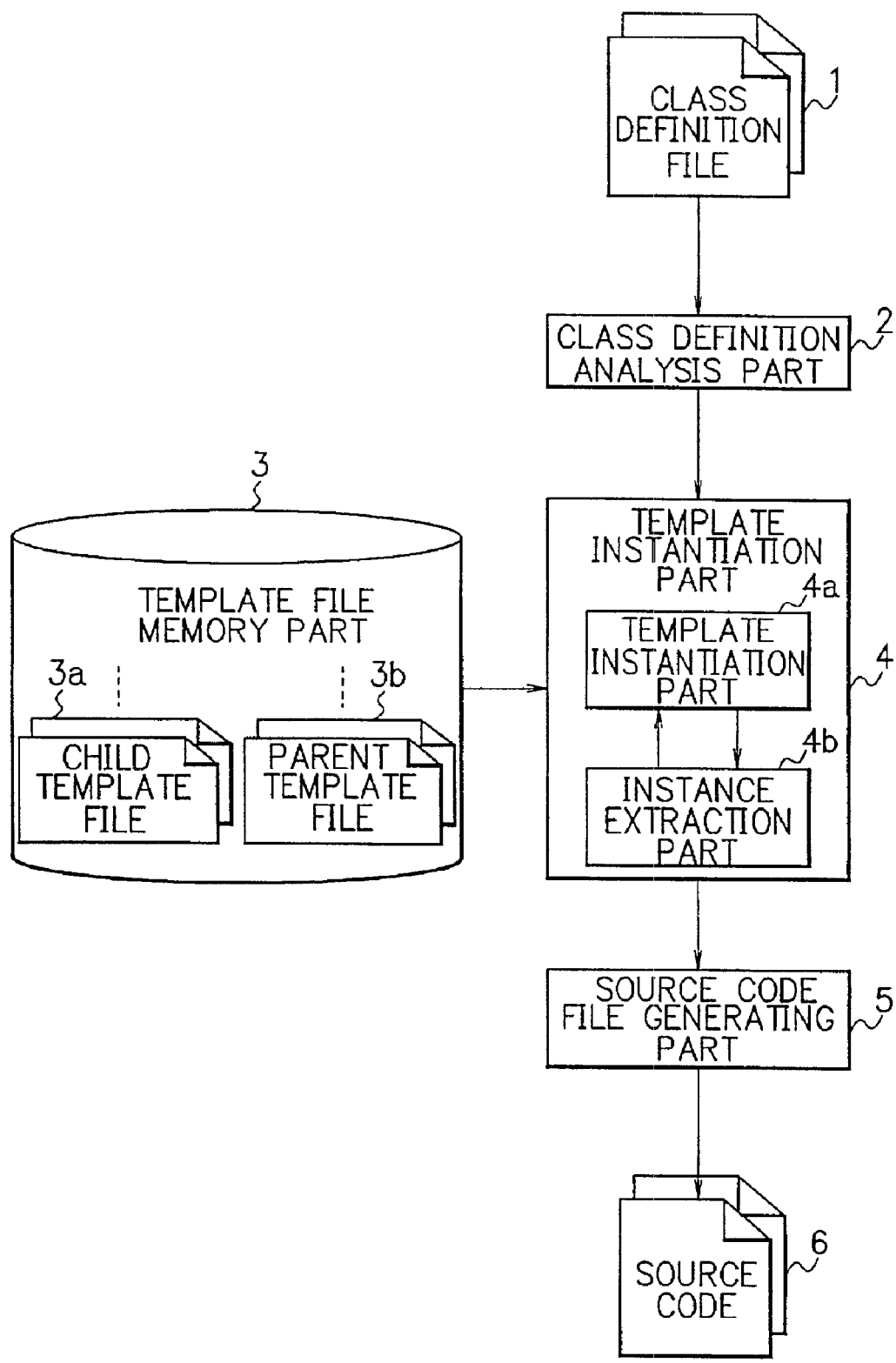

F I G. 4

```
Person    {
    int        age;
    String     address;
}
```

FIG. 5A

```
class $NAME$ {
  public:
     $MEMBER_FUNCTION_DECLARES$
};
```
~3b-1

FIG. 5B

```
#include <$NAME$ .h>

$MEMBER_FUNCTION_IMPLEMENTES$
```
~3b-2

FIG. 5C

~3a
```
$BEGIN:DECLARE$
     void       set_$NAME$ ($TYPE$ data);
     $TYPE$   get_$NAME$();
$END:DECLARE$ $BEGIN:IMPLEMENT$
void $CLASS$ ::set_$NAME$( $TYPE$  data) {
     $NAME$=data;
}

$TYPE$  $CLASS$ ::get_$NAME$() {
     return $NAME$;
}
$END:IMPLEMENT$
```

F I G. 6

```
$BEGIN:DECLARE$
    void    set_$NAME$ ($TYPE$data);
    $TYPE$  get_$NAME$();
$END:DECLARE$ $BEGIN:IMPLEMENT$
void $CLASS$::set_$NAME$ ($TYPE$ data) {
    $NAME$=data;
}

$TYPE$ $CLASS$ ::get_$NAME$ () {
    return $NAME$;
}
$END:IMPLEMENT$
```
3a

```
REPLACE $NAME$ WITH age
REPLACE $TYPE$ WITH int
REPLACE $CLASS$ WITH Person
```

```
REPLACE $NAME$ WITH address
REPLACE $TYPE$ WITH String
REPLACE $CLASS$ WITH Person
```

```
$BEGIN:DECLARE$
    void    set_age (int data);
    int     get_age ();
$END:DECLARE$ $BEGIN:IMPLEMENT$
void Person:set_age (int data) {
    age=data;
} int Person::get_age() {
    return age ;
}
$END:IMPLEMENT$
```
7-1

```
$BEGIN:DECLARE$
    void    set_address (String data);
    String  get_address();
$END:DECLARE$ $BEGIN:IMPLEMENT$
void Person:set_address (String data) {
    address=data;
}

String Person::get_address () {
    return address    ;
}
$END:IMPLEMENT$
```
7-2

F I G. 8
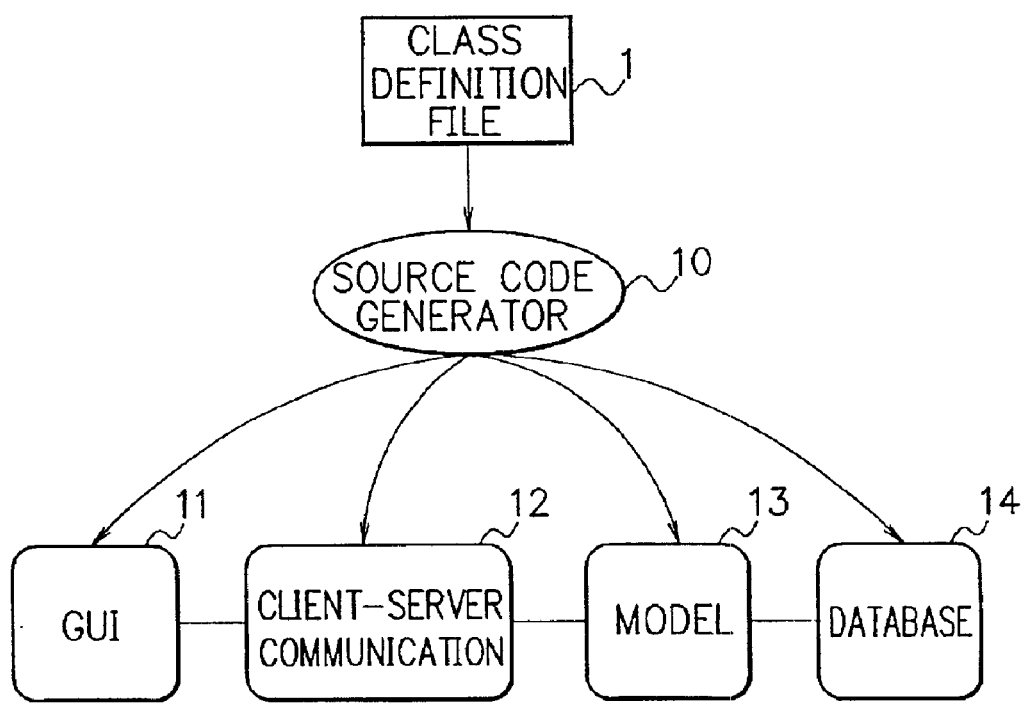

FIG. 9A

```
class C {
    $functions$
};
```

FIG. 9B

```
class C {
    void get_data();
    void set_data();
    void change_data();
};
```

PROGRAM GENERATING SUPPORT SYSTEM, PROGRAM GENERATING METHOD, STORAGE MEDIUM AND PROGRAM

CROSS-REFERENCE TO RELATED APPLICATIONS

This application is based upon and claims priority of Japanese Patent Application No. 2000-270163 and 2001-244282, filed on Sep. 6, 2000 and Aug. 10, 2001, the contents being incorporated herein by reference.

BACKGROUND OF THE INVENTION

1. Field of the Invention

The present invention relates to a program generating support system, program generating method, and further to a program for realizing them in terms of the function of software and a storage medium storing such a program.

2. Description of the Related Art

Conventionally, source code generators and the like have been used to assist creation of the computer programs. Such a source code generator is convenient when utilized to generate typical parts of programs, such as interface parts of inter-process communications or parts that operates in accordance with specific rules. The source code generator automatically generates a desired source code by preparing a template for the source code in advance and by inputting specification information of the program or the like into the template, for example.

FIGS. 9A and 9B illustrate the operations of the conventional source code generator. FIG. 9A shows a certain template file, and FIG. 9B shows a source code generated using the template of FIG. 9A. Here, the case of generating a source code that declares a function using a template relating to a class in object oriented programming is illustrated as an example.

When a source code, such as the one shown in FIG. 9B is generated using a template, such as the one shown in FIG. 9A, it is known in advance that the following three lines need to be included in the source code generated:

void get_data( );

void set_data( );

void change_data( ).

Thus, a program that automatically generates these three lines from the part $functions$ in the template is prepared separately from the template. The source code shown in FIG. 9B is generated using the thus prepared program and the template of FIG. 9A, for example.

In the conventional source code generator, it is possible to generate different source codes by preparing a plurality of templates as files and by switching templates used. However, in the conventional source code generator, it is necessary to prepare a program (generator engine), separately from the templates, for expanding the templates to generate the desired source code. Accordingly, while it is possible to change the predetermined parts of the templates and existence/location of parameters, it is not possible to change contents of parameter expansion unless the program of the generator engine is rewritten.

In program development, however, there often are situations where a separate source code that is very similar to a certain source code is needed, or incremental addition of the source code is needed. In such cases, in the conventional art, even though the same templates are used, the program of the generator engine for generating the source code needs to be newly prepared every time, requiring significant efforts, which is a disadvantage.

SUMMARY OF THE INVENTION

The present invention has been completed to solve the above-mentioned problems. An object of the present invention is to enable flexible source code automated generation by allowing easy alteration of the contents of parameter expansion.

A program generating support system of the present invention is a program generating support system for automatically generating a source code using templates, and is characterized by including template memory means for storing templates that are multiplexed such that at least a part of a content description of a higher order template is represented by a lower order template; and instantiating means for generating a desired source code by performing instantiation from the above-mentioned lower order template, and by inputting the generated lower order instance into the higher order template to perform further instantiation.

A program generating method of the present invention is a program generating method for automatically generating a source code using templates, and is characterized by including the steps of multiplexing templates such that at least a part of a content description of a higher order template is represented by a lower order template; and generating a desired source code by performing instantiation from the above-mentioned lower order template, and by inputting the generated lower order instance into the higher order template to perform further instantiation.

A computer readable recording medium of the present invention is characterized by storing a program causing a computer to function as template memory means and instantiating means, wherein the above-mentioned template memory means stores templates that are multiplexed such that at least a part of a content description of a higher order template is represented by a lower order template, and wherein the above-mentioned instantiating means generates a desired source code by performing instantiation from the above-mentioned lower order template, and by inputting the generated lower order instance into the higher order template to perform further instantiation.

In another aspect, a computer readable recording medium of the present invention is characterized by storing a program causing a computer to executes processes that generate a desired source code using templates that are multiplexed such that at least a part of a content description of a higher order template is represented by a lower order template, the processes including performing instantiation from the above-mentioned lower order template, and inputting the generated lower order instance into the higher order template to perform further instantiation.

Further, a program product of the present invention causes a computer to function as template memory means and instantiating means, wherein the above-mentioned template memory means stores templates that are multiplexed such that at least a part of a content description of a higher order template is represented by a lower order template, and wherein the above-mentioned instantiating means generates a desired source code by performing instantiation from the above-mentioned lower order template, and by inputting the generated lower order instance into the higher order template to perform further instantiation.

In a further aspect, a program product of the present invention causes a computer to execute processes that generate a desired source code using templates that are multiplexed such that at least a part of a content description of a higher order template is represented by a lower order template, the processes including performing instantiation from the above-mentioned lower order template, and inputting the generated lower order instance into the higher order template to perform further instantiation.

BRIEF DESCRIPTION OF THE DRAWINGS

FIG. 2 is a block diagram showing an example of a system construction employing the program generating support system of the embodiment;

FIG. 4 is a diagram showing an example of the class definition file of the preferred embodiment;

FIGS. 5A, 5B, and 5C are diagrams showing examples of child template files and parent template files of the embodiment;

FIG. 6 is a diagram showing instantiation of a child template file in detail according to the embodiment;

FIG. 8 is a diagram showing an example of generating source codes of various usage from a single class definition file; and FIGS. 9A and 9B are diagrams for explaining the operation of the conventional source code generator.

DETAILED DESCRIPTION OF THE PREFERRED EMBODIMENTS

A preferred embodiment of the present invention will be described below with reference to the drawings.

The program generating support system of this embodiment multiplexes templates when generating the desired source code. And when there are any patterns or rules in expanding parameters, for example, the patterns are prepared as different templates (child templates).

Figure 1:
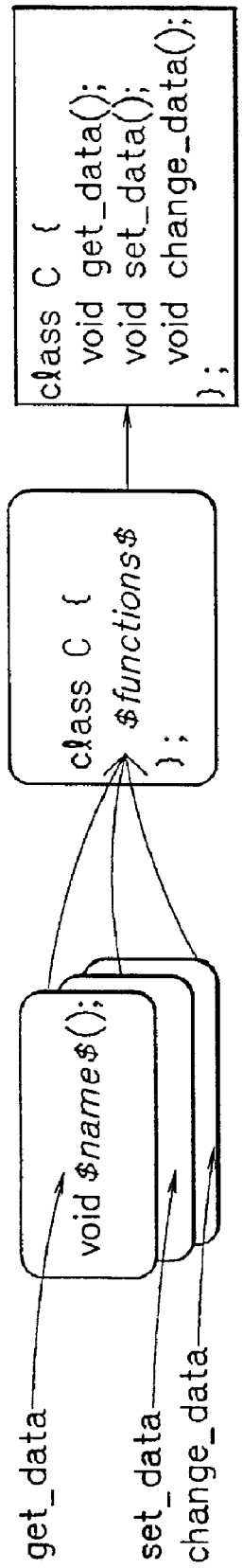
FIGS. 1A, 1B, and 1C are diagrams for explaining the operation of a program generating support system according to an embodiment of the present invention.

FIGS. 1A to 1C are diagrams for explaining the operation (program generating method) of the program generating support system according to the embodiment, and show the concept of template file used in this embodiment. As in the case of FIGS. 9A and 9B, FIGS. 1A to 1C show the case where a source code for declaring a function is generated using template files relating to object oriented programming. However, the present invention is not limited to this example.

As described above, in the conventional source code generator, in order to generate the source code, such as the one shown in FIG. 1C, a generator engine program is prepared for generating the source code from a class template, such as the one shown in FIG. 1B, and the template of FIG. 1B is expanded using the generator engine program to yield the desired source code.

In contrast, in the program generating support system of the present embodiment, a function defining part ($functions$) contained in the class template file of FIG. 1B is prepared as separate function template files, as shown in FIG. 1A. The class template file is created based on a high level specification of the desired product. The function template files are created based on detailed parts of the class template. In this sense, the function templates are nested in the class template. Hereafter, the high level template corresponding to the outer side of the nesting structure is referred to as a "parent template", and the low level templates corresponding to the inner side of the nesting structure are referred to as "child templates."

In the present embodiment, three (3) child instances are generated by inputting parameters, "get_data," "set_data," and "change_data," into the respective function template files of FIG. 1A (child templates) and by expanding them. Moreover, the source code shown in FIG. 1C is generated as the final product by inputting the thus generated three child instances into the class template file of FIG. 1B (parent template) and by expanding it.

In this way, using the multiplexed templates, different source codes can be generated by merely changing the child templates as needed without changing the generator engine program. Changing a template is far easier as compared to rewriting the generator engine program.

FIG. 2 is a block diagram showing an example of the system structure that employs the program generating support system according to the present embodiment. While FIG. 2 shows the case of generating an object oriented source code, such as the one shown in FIGS. 1A to 1C, the source code to be generated is not limited to object oriented codes.

In FIG. 2, a class definition file 1 is specification definition information that describes the specification of a source code to be generated or the like in the form of text data or the like. The class definition file 1 contains at least parameters that should be inputted to child templates.

A class definition analysis part 2 analyzes the content of the class definition file 1, and extracts the parameters that should be inputted to the child templates. In this example, the extracted parameters are information regarding function names and types, etc.

A template file memory part 3 stores at least one child template file 3a and at least one parent template file 3b, and is constructed by a storage device, such as a hard disk, for example.

A template instantiation part 4 is equipped with - a template instantiation part 4a and an instance extraction part 4b, and instantiates (materializes) a template, which is read out from the template file memory part 3, by inputting the respective parameters extracted from the class definition analysis part 2 and by expanding the template.

The template instantiation part 4a instantiates each template included in the child template files 3a and the parent template files 3b. The instance extraction part 4b performs the processes of extracting child instances that are generated from the child template file 3a by the template instantiation part 4a, and supplying the thus extracted child instances back to the template instantiation part 4a for instantiating the parent template.

That is, when instantiating the child templates, the instantiation part 4a generates the child instances from the child templates included in the corresponding child template files 3a, which are read from the template file memory part 3, by inputting the parameters that are extracted from the class definition analysis part 2 and by expanding the child templates.

Also, when the instantiation part 4a instantiating the parent template, the extraction part 4b extracts the child instances generated by the instantiation part 4a and return them to the instantiation part 4a. The instantiation part 4a then generates parent instances from the parent templates included in the respective parent template files 3b, which are read out from the template file memory part 3, by inputting the child instances supplied from the extraction part 4b and expanding the parent template.

The parent instances thus generated are source codes representing predetermined parts of a program, such as interface part for inter-process communications or a part that operates in accordance with the specific rules.

The source code file generating part 5 generates a file of a large source code 6, which is the final product, from multiple parent instances generated by the template instantiation part 4 in this way.

Here, each of the class definition analysis part 2, the template instantiation part 4, and the source code file generating part 5 of the program generating support system, which are described above, is actually constructed by a microcomputer composed of a CPU, a ROM, a RAM, and the like.

Figure 3:
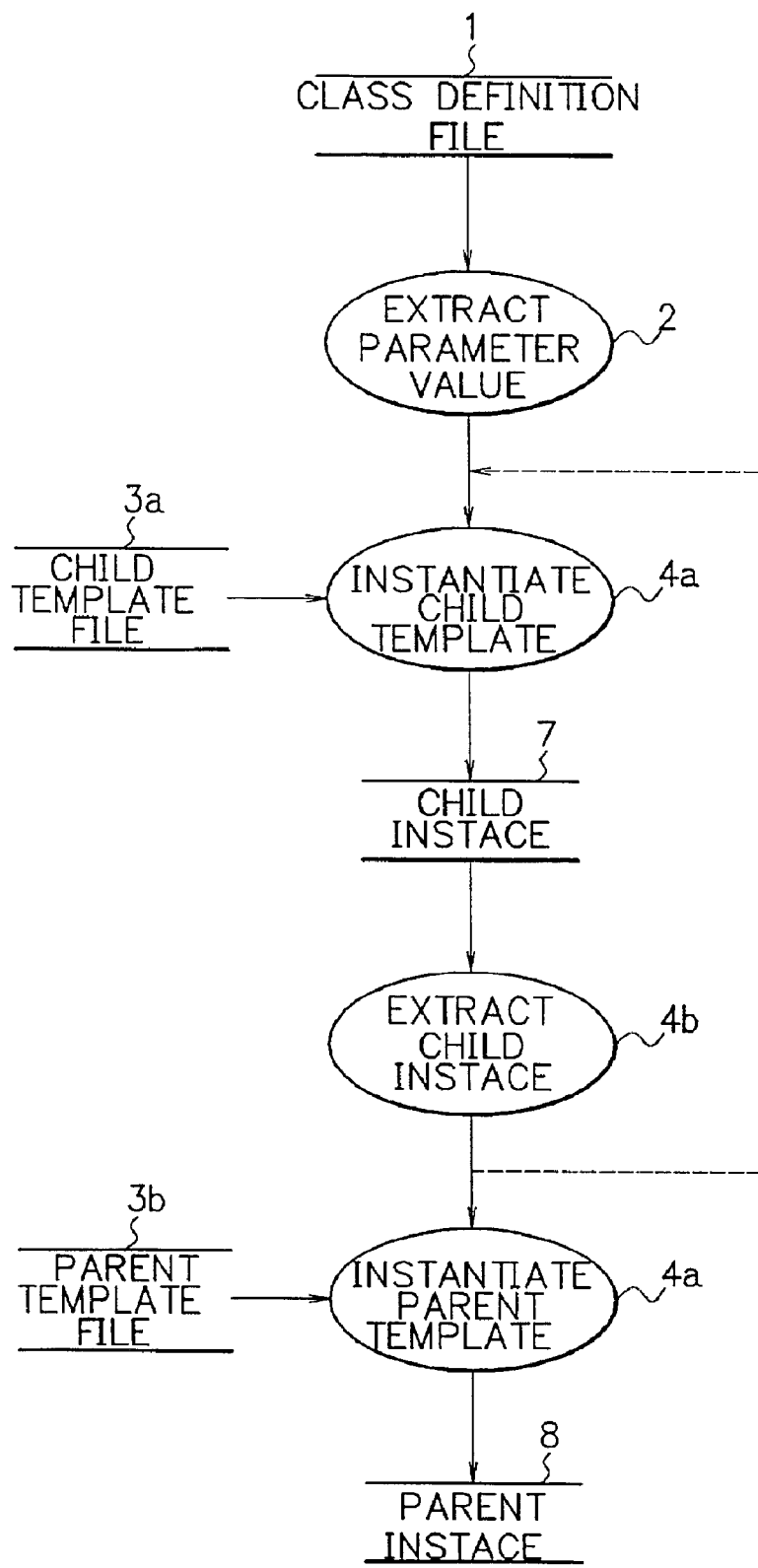
FIG. 3 is a data flow diagram showing the template expansion procedure of the program generating support system of the embodiment.
Figure 4:
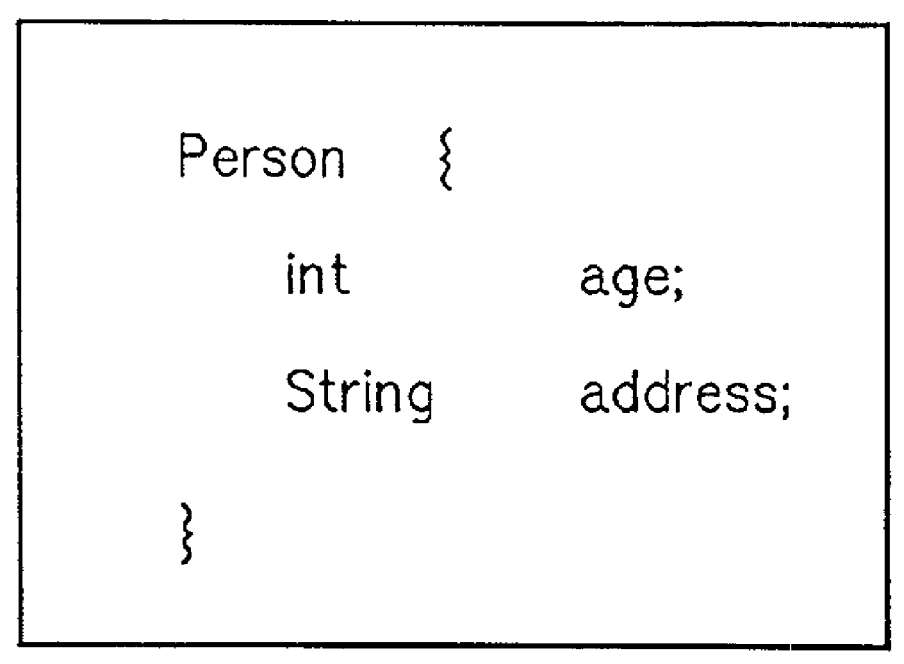

FIG. 3 is a data flow diagram showing the procedure of the template expansion by the program generating support system of the present embodiment. FIG. 4 shows an example of a class definition file 1. FIGS. 5A and 5B show examples of the parent template files 3b. FIG. 5C shows an example of child template files 3a. The procedure of the template expansion shown in FIG. 3 will be explained in detail with reference to examples shown in FIGS. 4 and 5A to 5C.

In FIG. 3, first, parameters that should be inputted to the child templates are extracted from the class definition file 1 in the class definition analysis part 2. If the class definition file 1 is written as shown in FIG. 4, the class definition analysis part 2 extracts two parameters, "age" and "address," as the function names, and extracts two parameters, "int" and "String," as the function types. Here, the example of the class definition file 1 of FIG. 4 indicates that the integer type function "age" and String type function "address" are included in the class "Person".

Next, the template instantiation part 4a instantiates a child template by inputting each of the parameters thus extracted into the child template file 3a, such as the one shown in FIG. 5C, which is read out from the template file memory part 3, and by expanding the child template file 3a, thereby generating a child instance 7.

The instance extraction part 4b extracts the thus generated child instance 7, and thereafter, the template instantiation part 4a instantiates parent templates by inputting the extracted child instance 7 into parent template files 3b, such as the ones shown in FIG. 5A and 5B, which are read out from the template file memory part 3, and by expanding the parent templates, thereby generating parent instances 8.

Also, a child template may have one or more of lower level templates corresponding to its own child templates (grand child templates) in a nesting structure. In such a case, as shown in the dotted line in FIG. 3, after child instances are extracted in the child instance extraction part 4b, the process returns in front of the child template instantiation part 4a, and child instance generation is repeated.

FIG. 6 shows in detail the instantiation of the above-mentioned child template file 3a shown in FIG. 5C. The single child template file 3a shown here contains two (2) child templates which are a part that begins with "$BEGIN:DECLARE$" and ends with "$END:DECLARE$" and another part that begins with "BEGIN:IMPLEMENT$" and ends with "$END:IMPLEMENT$".

As described above, two (2) function types and two (2) function names are written in the class definition file 1 shown in FIG. 4, and they are extracted by the class definition analysis part 2. Therefore, when the child template file 3a is instantiated, two (2) child instances $7_{-1}$ and $7_{-2}$ shown in FIG. 6 are generated by inputting the parameters in sequence and repeating instantiation twice.

That is, as shown in FIG. 6, by replacing "$NAME$", "$TYPE$", and "$CLASS$" in the child template file 3a with "age", "int", and "Person", respectively, the first child instance $7_{-1}$ is generated. Also, by replacing "$NAME$", "$TYPE$", and "$CLASS$" in the child template file 3a with "address", "String", and "Person", respectively, the second child instance $7_{-2}$ is generated.

Figure 7A:
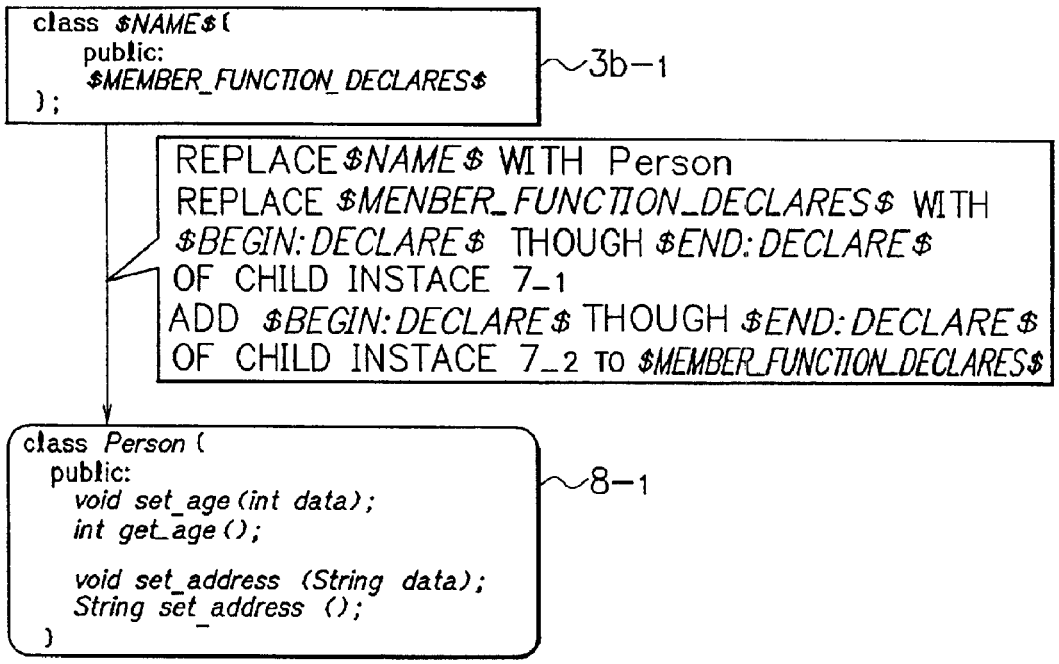
FIGS. 7A and 7B are diagrams showing instantiation of parent template files in detail according to the embodiment.
Figure 7B:
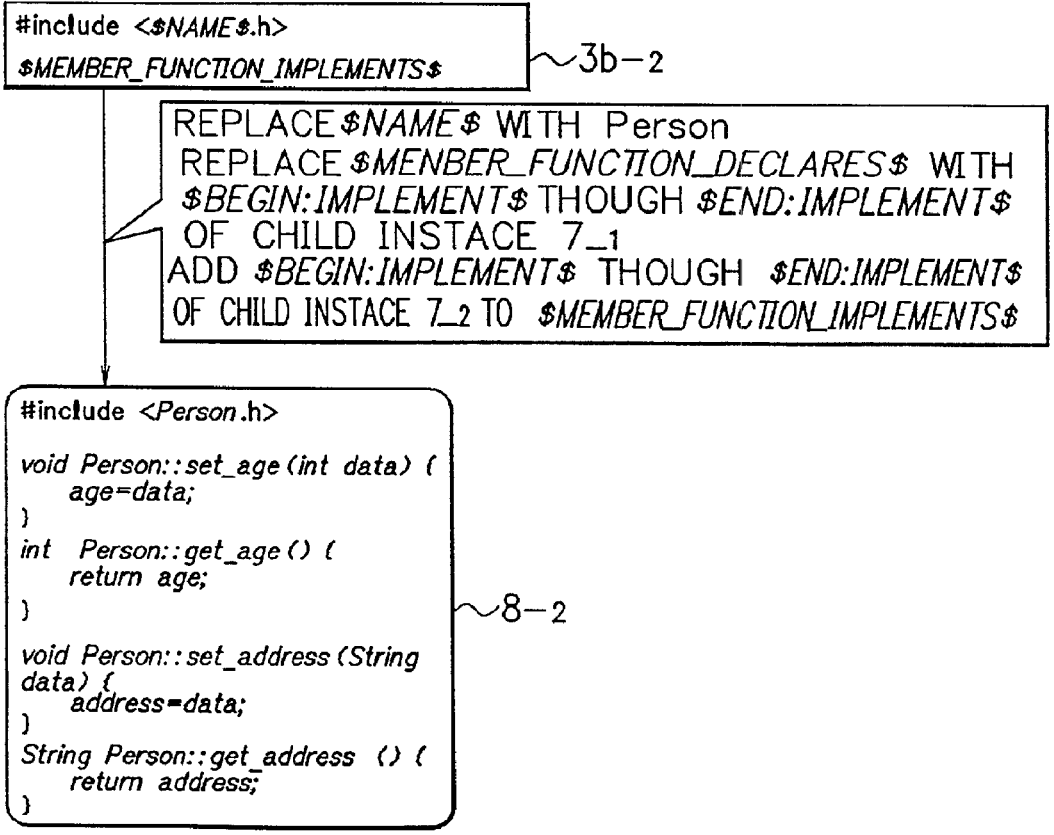

FIGS. 7A and 7B show in detail the instantiation of two (2) parent template files $3b_{-1}$ and $3b_{-2}$ shown in FIGS. 5A and 5B. In the parent template file $3b_{-1}$ shown in FIG. 7A, the part "$MEMBER_FUNCTION_DECLARES$" designates the corresponding child instance, and in the parent template file $3b_{-2}$ shown in FIG. 7B, the part "$MEMBER_FUNCTION_IMPLEMENTS$" designates the corresponding child instance.

For example, upon instantiation of the parent template file $3b_{-1}$, "$NAME$" in the parent template file $3b_{-1}$ is replaced with "Person", and the part "$MEMBER_FUNCTION_DECLARES$" is inputted with the corresponding part of the child instances (the parts that begin with "$BEGIN:DECLARE$" and end with $END:DECLARE$") in order to expand the parent template file.

In this case, two (2) child instances $7_{-1}$ and $7_{-2}$ have been generated from child template file 3a, and the part designated by "DECLARE" is included in each of the child instances $7_{-1}$ and $7_{-2}$. Accordingly, a first parent instance $8_{-1}$ is generated by replacing the "$MEMBER_FUNCTION_DECLARES$" with the code situated between "$BEGIN:DECLARE$" and "$END:DECLARE$" of the first child instance $7_{-1}$, and by adding to "$MEMBER_FUNCTION_DECLARES$" the code situated between "$BEGIN:DECLARE$" and "$END:DECLARE$" of the second child instance $7_{-2}$.

In the case of instantiating the other parent template file $3b_{-2}$, "$NAME$" in the parent template file $3b_{-2}$ is replaced with "Person," and the part "$MEMBER_FUNCTION_IMPLEMENTS$" is inputted with the corresponding part of the child instances (the parts that begin with "$BEGIN:IMPLEMENT$" and end with "$END:IMPLEMENT$") in order to expand the parent template file.

In this case also, the part designated by "IMPLEMENT" is included in each of the generated child instances $7_{-1}$ and $7_{-2}$. Accordingly, a second parent instance $8_{-2}$ is generated by replacing "$MEMBER_FUNCTION_IMPLEMENTS$" with the code situated between "$BEGIN:IMPLEMENT$" and "$END:IMPLEMENT$" of the first child instance $7_{-1}$, and by adding to "$MEMBER_FUNCTION_IMPLEMENTS$" the code situated between "$BEGIN:IMPLEMENT$" and "$END:IMPLEMENT$" of the second child instance $7_{-2}$.

As explained above in detail, according to the program generating support system of the embodiment, the templates are multiplexed so that the patterns of expansion procedures of parameters that obey certain rules and patterns are prepared as separate child templates. Accordingly, it becomes possible to easily generate different source codes by merely changing the child templates without changing the generator engine program.

In the above example shown in FIGS. 6, 7A, and 7B, the source codes of the parent instances $8_{-1}$ and $8_{-2}$ each include two commands, "set_age" and "get_age" with respect to the "int" type function "age." Now, suppose that a command, "change_age," needs to be additionally included in the generated source codes.

In order to write the "change_age" string into the source code, the conventional source code generator needs to either add a new generator engine program, or modify the original generator engine program in an appropriate manner. In contrast, according to the present embodiment, it becomes possible to add the "change_age" string to the final product source code by merely changing child templates, which are prepared separately from the generator engine program.

Also, when a new function that is different from "age" or "address" needs to be added to the generated source code, the source code with such a new function is easily generated by adding the desired function type and function name to the class definition file 1 and by performing process in a manner similar to the above-mentioned procedure without a need of changing the generator engine program.

Because the content of parameter expansion can be easily changed by changing the child templates and the class definition files, automatic generation of the source code can be flexibly conducted in cases, such as where the source codes very similar to the already created source codes need to be generated or source codes need to be added in an incremental manner.

Also, when a child template is instantiated, the way the original child template is written can be reflected to the resulting child instance. As described above, in the example of FIG. 6, when the first child instance $7_{-1}$ is generated, "$NAME$" in the child template file 3a is replaced with function name "age" in its exact form as extracted from the class definition file 1, thereby replacing the part "set_$NAME$" in the child template file 3a with "set_age".

Alternatively, reflecting the fact that the "$NAME$" part in the child template file 3a is written in capital letters, the "set_$NAME$" part may be replaced with "set_AGE". In this case, if the child template file 3a is written without the under bar, "set$NAME$", the "set$NAME$" part will be replaced with "setAGE".

In this way, when the detailed way the child templates are written is taken into account in generating the child instances $7_{-1}$ and $7_{-2}$, changing of the way the child templates are written will produce variations in the resulting child instances $7_{-1}$ and $7_{-2}$ generated therefrom and the parent instances $8_{-1}$ and $8_{-2}$ generated from the child instances $7_{-1}$ and $7_{-2}$ thus generated. Thus, simple changes in the child templates enable generation of different source codes.

FIG. 8 shows an example where various source codes for different applications are generated from a single class definition file 1 by merely changing the way the child templates are written.

As shown in FIG. 8, the program generating support system 10 (the source code generator) of this embodiment generates GUI-use source code 11, client-server communication-use source code 12, model-use source code 13, and database-use source code 14 from a single class definition file 1. Here, the term "model" represents modeling of real world tasks and processes by substitution with data.

In this way, the final product source code is generated by combining the source codes 11 through 14 that are generated for various purposes by the source code generator 10 and further, if necessary, by combining non-standardized source codes or the like that are created by a programmer.

Also, the program generating support system of the above-explained preferred embodiment may be constructed of the CPU or MPU, RAM, ROM and the like of a computer, and is realized by executing the program stored in the RAM or ROM. Thus, such a program is included as an embodiment of the present invention. Also, a program that causes a computer to operate to perform the above-mentioned functions can be stored in a recording medium, such as a CD-ROM, and the program generating support system is realized by causing the computer to read the stored program. Thus, such a recording medium is also included as an embodiment of the present invention. In the alternative to CD-ROMs, the above-mentioned recording medium that stores the program can be flexible disk, hard disk, magnetic tape, magnetooptical disk, and nonvolatile memory card.

Also, a program product in which a computer executes a program to realize the functions of the above-mentioned embodiment is also included as an embodiment of the present invention. Examples of such a program product include the program itself that realizes the functions of the above-mentioned embodiment, a computer into which the above-mentioned program is read, a transmitting device capable of providing the above-mentioned program to computers connected through a network so that they can have communication, and a network system including the transmitting device.

Also, embodiments of the present invention include not only the cases where the computer executes the program to realize the functions of the above-mentioned embodiment, but also the cases where the functions of the above-mentioned preferred embodiment are realized with a program cooperating with the OS (Operating System) under which the program is running and cases where all or part of the processing of the supplied program is performed in the function extension boards or function extension units of the computer to realize the functions of the above-mentioned preferred embodiment.

Also, in order to use the present invention in the network environment, the system may be configured such that all or part of the program can be executed on other computers.

Also, the above-mentioned embodiments merely are exemplary, and accordingly, the technical scope of the present invention should not be limited by the embodiments. That is, the present invention can be realized in a variety of forms without departing from its sprits and primary characteristics. For example, while in the above-mentioned preferred embodiment, templates are two-fold multiplexed into parent templates and child templates, greater multiplexing of templates is also possible.

As described above, the present invention generates a desired source code by multiplexing templates such that at least a part of a content description of a higher order template is represented by a lower order template, and by performing instantiation from the lower order template, and by inputting the generated lower order instance into the higher order template to perform further instantiation. Accordingly, the pattern of the content description that is to be expanded as a source code can be made flexible, and different source codes can easily be generated by merely changing the lower templates to be used without changing the engine program for instantiation. Thus, the automatic generation of source codes can be flexibly conducted.

What is claimed is:

1. A program generating support system for automatically generating a source code using templates, comprising:

template memory means for storing templates that are multiplexed in a nesting structure such that at least a part of a content description of a higher order template is represented by a lower order template; and instantiating means for generating a desired source code by performing instantiation from said lower order template, and by inputting the generated lower order instance into the higher order template to perform further instantiation.

2. The system according to claim 1, wherein said instantiating means performs instantiation of the lowest order template by inputting parameters extracted from specification information of said source code.

3. The system according to claim 1, wherein the template stored in said template memory means includes one or more of templates in a single template file.

4. The system according to claim 1, wherein said instantiating means performs instantiation corresponding to the type of characters written in said template upon generating the instance.

5. A program generating method for automatically generating a source code using templates, comprising the steps of:

multiplexing templates in a nesting structure such that at least a part of a content description of a higher order template is represented by a lower order template; and generating a desired source code by performing instantiation from said lower order template, and by inputting the generated lower order instance into the higher order template to perform further instantiation.

6. The method according to claim 5, wherein when the lowest order template is instantiated, the instantiation is performed by inputting parameters extracted from specification information of said source code.

7. The method according to claim 5, wherein the instantiation is conducted by selectively using a template designated by the higher order template among one or more of templates included in a single template file.

8. The method according to claim 5, wherein when an instance is generated from said template, instantiation corresponding to the type of characters written in said template is performed.

9. A computer readable recording medium storing a program causing a computer to function as template memory means and instantiating means, wherein said template memory means stores templates that are multiplexed in a nesting structure such that at least a part of a content description of a higher order template is represented by a lower order template, and wherein said instantiating means generates a desired source code by performing instantiation from said lower order template, and by inputting the generated lower order instance into the higher order template to perform further instantiation.

10. The medium according to claim 9, wherein when an instance is generated from said template, instantiation corresponding to the type of characters written in said template is performed.

11. A computer readable recording medium storing a program causing a computer to executes processes that generate a desired source code using templates that are multiplexed in a nesting structure such that at least a part of a content description of a higher order template is represented by a lower order template, the processes including performing instantiation from said lower order template, and inputting the generated lower order instance into the higher order template to perform further instantiation.

12. The medium according to claim 11, wherein when an instance is generated front said template, instantiation corresponding to the type of characters written in said template is performed.

13. A program product causing a computer to function as template memory means and instantiating means, wherein said template memory means stores templates that are multiplexed in a nesting structure such that at least a part of a content description of a higher order template is represented by a lower order template, and wherein said instantiating means generates a desired source code by performing instantiation from said lower order template, and by inputting the generated lower order instance into the higher order template to perform further instantiation.

14. The product according to claim 13, wherein when an instance is generated from said template, instantiation corresponding to the type of characters written in said template is performed.

15. A program product causing a computer to execute processes that generate a desired source code using templates that are multiplexed in a nesting structure such that at least a part of a content description of a higher order template is represented by a lower order template, the processes including performing instantiation from said lower order template, and inputting the generated lower order instance into the higher order template to perform further instantiation.

16. The product according to claim 15, wherein when an instance is generated from said template, instantiation corresponding to the type of characters written in said template is performed.

* * * * *